Sept. 7, 1965          P. J. SENG          3,205,002
ROOF BOW FITTING FOR VEHICLE WITH REMOVABLE SIDE SECTIONS
Filed July 6, 1964          2 Sheets-Sheet 1
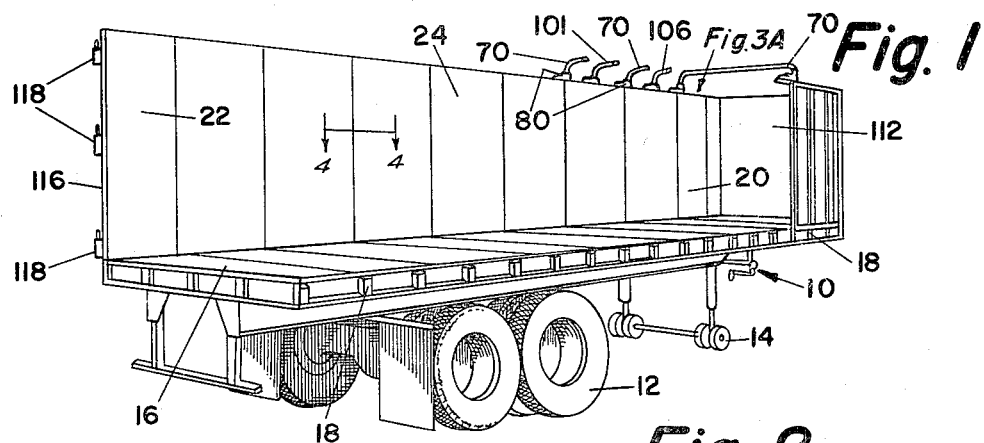
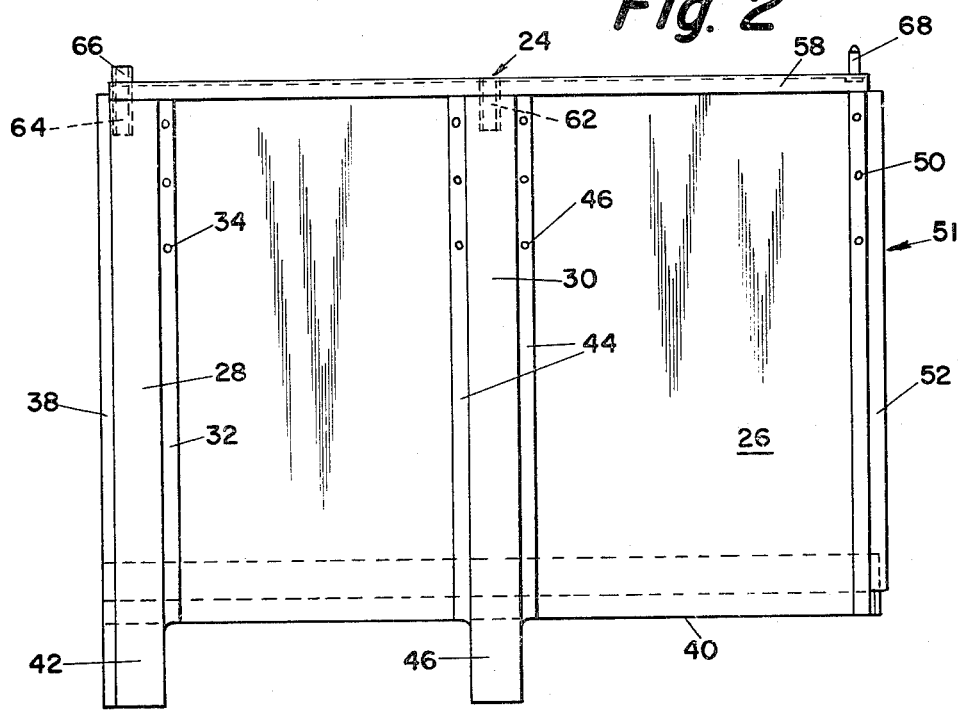
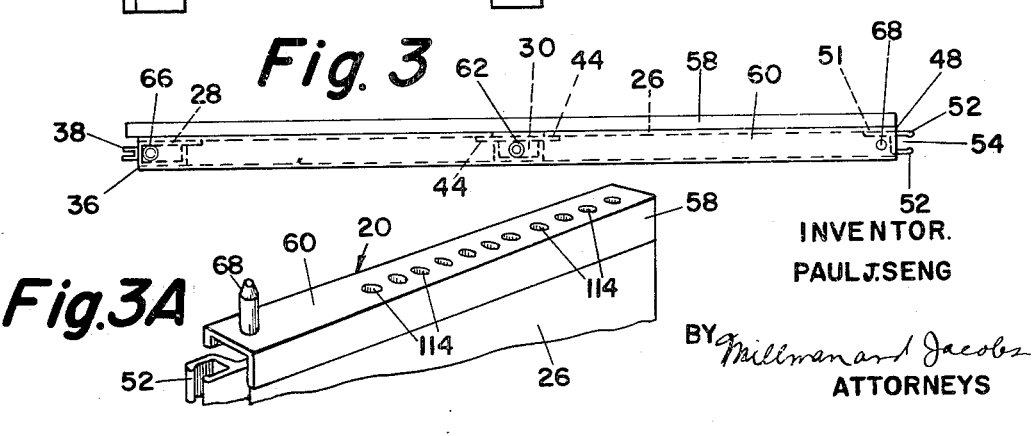
INVENTOR.
PAUL J. SENG
BY *Millman and Jacobs*
ATTORNEYS

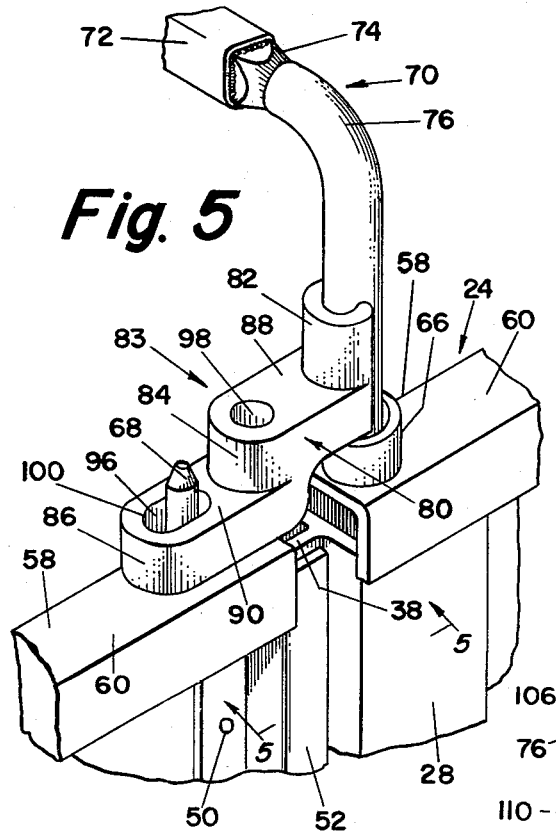

United States Patent Office 3,205,002
Patented Sept. 7, 1965

3,205,002
ROOF BOW FITTING FOR VEHICLE WITH
REMOVABLE SIDE SECTIONS
Paul J. Seng, Langhorne, Pa., assignor to Strick Trailers,
a Division of Fruehauf Corporation, Fairless Hills, Pa.,
a corporation of Michigan
Filed July 6, 1964, Ser. No. 380,381
7 Claims. (Cl. 296—100)

This invention relates to over-the-road vehicles whose bodies are constructed of removable side sections or racks with tongue and groove interengagement at the vertical edges of adjacent racks and more particularly to roof bows therefor which are equipped with fittings interconnecting adjacent racks at their upper ends, the primary object of which is to permit flexibility of longitudinal and vertical movement between the racks but to prevent total disengagement of the tongues from their respective grooves, thereby avoiding formation of undesirable gaps between the racks at their upper ends.

Another object of the invention is to provide a roof bow and fitting for a vehicle constructed of removable racks of the character above described in which the tongue and groove connection between the vertical edges of adjacent racks is of the labyrinth type which cooperates with fittings to prevent gapping at the upper ends of the rack as well as seepage of water at the vertical connecting edges into the interior of the vehicle.

Another object of the invention is to provide a removable rack vehicle body with roof bows and fittings at their ends interconnecting the upper ends of adjacent racks, the fittings being so constructed as to permit their nesting for the compact storage of many roof bows in an accessible area of the vehicle when not in use.

Another object of the invention is to provide a removable rack vehicle body with tongue and groove interengagement at the vertical edges of adjacent racks and roof bows with fittings fixed thereto above the ends of the bows, the racks being interchangeable, each including a pin upstanding from the upper edge of the rack adjacent one vertical edge and a socket opening through the upper end of the rack at the opposite vertical edge, the end of the bow beneath the fitting extending into the socket of one rack, the fitting including an elongated slot receiving the pin upstanding from the adjacent rack.

Yet another object of the invention is to provide a vehicle body constructed of removable racks, roof bows and fittings associated with the roof bows flexibly joining the upper ends of adjacent racks, the racks being interchangeable for the major length of the vehicle, each rack including means at its upper end intermediate its vertical edges to removably receive additional roof bows without fittings, if needed, there being front starter panels with means to removably retain and store a plurality of nested roof bows with and without fittings.

These and other objects of the invention will become more apparent as the following description proceeds in conjunction with the accompanying drawings, wherein:

FIG. 1 is a perspective view of a vehicle partially erected in accordance with the instant invention;

FIG. 2 is a side elevational view of removable side panel or rack per se;

FIG. 3 is a top plan view of the rack shown in FIG. 2;

FIG. 3A is a fragmentary perspective view of a front starter panel or rack;

FIG. 4 is a fragmentary perspective view of the roof bow and fitting and the upper ends of adjacent racks to which the fitting is applied;

FIG. 5 is a sectional view taken on the line 5—5 of FIG. 4;

FIG. 6 is an end elevational view of nested roof bows; and

FIG. 7 is a fragmentary side elevational view of an intermediate roof bow without a fitting.

Specific reference is now made to the drawings in which similar reference characters are used for corresponding elements throughout.

Indicated generally at 10 is a vehicle body or semi-trailer having running gear 12, landing gears or supports 14 and a flat bed 16 the side portions of which are provided with spaced open-ended stake pockets 18.

With the exception of the front starter units 20, see FIG. 3A, and the rear or finish units 22 for mounting the doors, see FIG. 1, the remaining side sections or racks 24 are the same and are removably retained on the bed 16 via the stake pockets. Each rack includes a substantially rectangular sheet of metal 26 to the front face of which is secured vertical hollow posts 28 and 30 of substantially rectangular cross section.

The post 28 includes a flange 32 overlying the sheet to which it is secured by appropriate rivets 34, the opposite vertical edge 36 of the post constituting, in effect, a vertical edge of the rack. Extruded with or secured to the post 28 and extending outwardly of the edge 36 in a plane substantially parallel to the sheet is a pair of vertically extending laterally spaced substantially parallel legs 38 forming a tongue member. Except for the flange 32, the post 28 and tongue 38 extend below the lower edge 40 of the rack as at 42 and are adapted to be removably received through the open upper end of a stake pocket 18.

The post 30 includes oppositely extending flanges 44 overlying the sheet to which they are attached by appropriate rivets 46, the post being positioned centrally of the sheet and extending, except for the flanges 44 as at 46, below the lower edge 40 of the rack and adapted to be received in an adjacent stake pocket 18.

At the vertical edge 48 of the sheet opposite the first-mentioned vertical edge 36, there is secured as by rivets 50 a vertical member 51 having a pair of laterally spaced longitudinally extending legs 52 which form a groove 54 therebetween, the legs extending beyond the vertical edge 48. The free vertical edges 56, see FIG. 4, of the legs 52 are rounded and spaced apart a distance slightly in excess of the distance between the outer surfaces of the tongue-forming legs 38 which said groove 54 is adapted to receive. The rounded edges 56 ease the connection between the tongue and groove. Moreover, by using a tongue member of spaced legs 38, water, if it does get behind the outer groove leg 52, will take a circuitous path and eventually end up in the groove 54 between the legs 38 and drain out of the bottom thereof. This circuitous or labyrinthian path will effectively prevent the water from passing into the interior of the vehicle. It will also be seen that the member 51 does not extend beyond the lower edge 40 of the rack and hence is not received as such in a stake pocket.

Riveted to the sheet and receiving its upper edge and those of the posts 28 and 30 and member 51 is a channel member 58. Through the web 60 of the channel a hole is provided in which is secured by welding a pipe section 62 which extends into the interior of the central post 30. Similarly, a hole is provided in the web of the channel in which is welded another pipe section or socket member 64 having a portion 66 which extends vertically above the channel. Upstanding from the web of the channel adjacent the groove member 54 is a pointed pin 68.

Each of the racks includes, therefore, a tongue-forming vertical edge, an opposite groove-forming vertical edge, a socket member at the top above the tongue-forming edge and a pin at the top above the groove-forming edge, with a socket at the top intermediate the said tongue and groove-forming vertical edges.

The tongue member 38 of one rack is made to engage in the groove 54 of an adjacent rack and the extensions 42 and 46 of the posts 28 and 30 are slipped into adjacent stake pockets 18. To flexibly secure the upper ends of the racks together and at the same time provide a support for a covering, such as tarpaulin and the like, a combined roof bow and fitting 70 is provided. The roof bow comprises an elongated substantially rectangular spanning member 72 to each end of which is secured as at 74 a curved member 76 which terminates in a pointed end 78.

The fitting 80, preferably a casting, includes an arcuate portion 82 which is secured by welding to the curved portion 76 at a predetermined location above the pointed end 78 thereof. Extending longitudinally from the portion 82 is a bridging member 83 consisting of two portions 84 and 86 which are vertically spaced in step formation. Thus, for each fitting there is an upper step surface consisting of two vertically spaced ledges 88 and 90 and a lower step surface consisting of two vertically spaced ledges 92 and 94. An elongated slot 96 is provided in the portion 86 and opens through the upper surface 90 and the lower surface 94. Also, there is a hole or bore 98 which extends through the upper surface 88 of the member 84 and the lower surface 94 of the other member 86, the bore 98 being located, in effect, intermediate the ends of the bridging member 83.

After the racks are inserted in the stake pockets and the tongues and grooves of adjacent racks are in engagement, the combined roof bow 70 and fitting 80 are assembled on the racks, the pointed end 78 being inserted in socket member 64 (into which it fits snugly) until the lower ledge 92 engages the upper edge of the projecting portion 66 of the socket member. At the same time the pin 68 is made to extend through the slot 96 of the fitting. The length of the slot 96 relative to that of the tongue member 38 and the depth of the groove 54 is such that some longitudinal movement of the tongue in the groove is provided but not such as to produce a gap between the racks at their upper ends. Thus, when the pin 68 (which fits snugly only widthwise in the elongated slot 96) engages the front edge 100 of the slot at the extreme position of relative longitudinal movement between the racks, the tongue 38 still remains engaged in the groove 54.

At times it is desirable to employ additional roof bows between the bows 70 with the fittings 80. Such a bow is shown in FIG. 7 at 101 and consists of an elongated member 102 similar to member 72 which is secured at each of its ends as at 104 to a curved member 106 having a pointed insertion end 108 similar to members 76 and 78. Spaced from the pointed end 108 and secured to the curved member 106 is a lug 110 which serves as a stop to engage the channel member 58 after the ends 108 have been inserted in the socket members 62 intermediate the vertical edges of the rack.

At the front end of the vehicle a substantially U-shaped bulkhead 112 is employed having vertical posts and extensions thereof beyond its lower edge for attachment to the sides and front of the flat bed 16. Secured to each rear vertical edge of the bulkhead is the starter rack 20, see FIG. 3A, which is similar to the previously described rack 24 except that it is approximately half its width. Thus, the starter rack includes the sheet metal panel 26, the groove member 52 at its free vertical edge (to receive the tongue 38 of a regular rack 24), the upper channel member 58 and the upstanding pin 68. However, the web 60 of the channel of this starter rack is provided with a plurality of holes 114 spaced apart to conform to the distance between the center of the pointed end 78 of the roof bow 70 and the hole or bore 98 of its fitting which is also equal to the distance between the center of the bore 98 and that of the slot 96. Thus, when the vehicle is used as a flat bed trailer or is converted to one with removable racks but extra bows 70 with the fittings 80 and extra intermediate bows 101 are required to be carried in the vehicle, these bows can be nested and carried in compact form on the starter racks 20. This is accomplished by inserting the pointed ends 78 of the roof bow 70 in alternate holes 114. In doing so, it will be seen from FIG. 6 that the fittings 80 nest, i.e. the upper ledge 92 of one fitting rests on the lower ledge 90 of the next fitting. Then the pointed ends 108 of the bows 101 are inserted through the bores 98 of the fittings and into the holes 114 between those which have already received the roof bow ends 78.

At the rear of the vehicle finishing racks 22 are provided. These are also preferably half size racks of construction like that of the regular rack 24 except that the rear vertical edge 116 thereof does not contain a tongue or groove but does contain vertically spaced members 118 adapted to receive a mating member (not shown) on a rear door (not shown) and form a hinge for the door to thereby complete the erected vehicle.

While a preferred embodiment of the invention has here been shown and described, skilled artisans may make minor variations without departing from the spirit of the invention and the scope of the appended claims.

I claim:

1. In a freight vehicle having removable side racks with interengaging vertical edges, elongated roof bows having an end extending removably through an aperture provided in the upper end of one side rack, an elongated member secured to said roof bow above the said end thereof and bridging the vertical edges between said one rack and an adjacent rack, and means removably attaching said bridging member adjacent its free end to said adjacent rack, said bridging member being formed of upper and lower step surfaces each including vertically spaced ledges extending in the same direction so that, for storage, said roof bows can be nested by having the upper ledge of the lower step surface engage the lower ledge of the upper step surface.

2. The combination of claim 1 and a vertical bore through said bridging member intermediate its free end and its point of attachment to said roof bow adapted to receive therethrough the free end of additional roof bows.

3. The combination of claim 2 wherein said means removably attaching said bridging member to said adjacent rack includes a pin upstanding from the upper end of said adjacent rack and an elongated slot through said bridging member receiving said pin.

4. The combination of claim 3 wherein said vehicle includes a pair of opposed side racks having a plurality of openings through their upper ends spaced conformably to the spacing between said end of said roof bow, said bore and said slot in said bridging member, said openings receiving the free ends of the nested roof bows with the lower ledges of the lower step surfaces bearing on the upper ends of said pair of last-named opposed side racks.

5. In a freight vehicle having a flat bed and side racks removably attached thereto, interengaging tongue and groove means at the vertical edges of adjacent racks, said tongue including a post open at its bottom end and laterally spaced members extending longitudinally from said post which are otherwise unconnected, said groove including laterally spaced walls between which said laterally spaced members of said groove are received so that a circuitous path is always present for passage of water between said spaced members of said tongue and eventual drainage out of said open bottom end of said post, an elongated roof bow having an end extending removably through an opening provided in the upper end of one of said racks, an elongated member secured to said roof bow above said end thereof and bridging said interengaging tongue and groove means, and means removably attaching said bridging member adjacent its free end to said adjacent rack.

6. In a freight vehicle having a flat bed and racks removably attached thereto in upright position, each rack including a substantially rectangular sheet of material having opposite vertical edges, a post open at its bottom end secured to one vertical edge including laterally spaced members extending longitudinally therefrom which are otherwise unconnected forming a tongue, another post secured to the other vertical edge including laterally spaced walls extending longitudinally therefrom forming a groove adapted to receive the laterally spaced members of the tongue of an adjacent rack so that a circuitous path is always present for passage of water between said spaced members of said tongue and eventual drainage out of said open bottom end of said post, an open-ended socket member at the upper edge of said rack adjacent one vertical edge and a pin upstanding from the upper edge of said rack adjacent the other vertical edge, the pin being adapted to extend into the slot of a bridging member having an end which is adapted to extend into the socket member of an adjacent rack when the tongue and groove of the adjacent racks interengage.

7. The combination of claim 6 and an intermediate vertical post secured to said sheet between said vertical edges and a second open-ended socket member at the upper edge of said rack extending into said intermediate post and adapted to receive the end of a roof bow.

References Cited by the Examiner

UNITED STATES PATENTS

| | | | |
|---|---|---|---|
| 2,955,874 | 10/60 | Brindley | 296—40 X |
| 3,010,755 | 11/61 | Black | 296—28 |
| 3,022,106 | 2/62 | Black | 296—40 X |
| 3,097,012 | 7/63 | Bain | 296—10 |
| 3,141,698 | 7/64 | Kandle | 296—28 X |

A. HARRY LEVY, *Primary Examiner.*

KENNETH H. BETTS, *Examiner.*